(12) United States Patent
Hawes et al.

(10) Patent No.: US 7,434,481 B2
(45) Date of Patent: Oct. 14, 2008

(54) CAPACITIVE SENSOR APPARATUS FOR PASSENGER PRESENCE DETECTION

(75) Inventors: Kevin J. Hawes, Greentown, IN (US); Morgan D. Murphy, Kokomo, IN (US); Lee R. Hinze, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 59 days.

(21) Appl. No.: 11/706,016

(22) Filed: Feb. 14, 2007

(65) Prior Publication Data

US 2008/0066563 A1  Mar. 20, 2008

Related U.S. Application Data

(60) Provisional application No. 60/844,621, filed on Sep. 14, 2006.

(51) Int. Cl.
*G01L 1/26* (2006.01)
*G01B 7/16* (2006.01)

(52) U.S. Cl. .................... 73/862.391; 73/780
(58) Field of Classification Search ................ 73/862.391–82.382, 780
See application file for complete search history.

(56) References Cited

U.S. PATENT DOCUMENTS

| | | | | |
|---|---|---|---|---|
| 5,353,641 A * | 10/1994 | Tang | ........... | 73/514.18 |
| 5,641,202 A * | 6/1997 | Rus | ........... | 297/335 |
| 5,975,958 A * | 11/1999 | Weidler | ........... | 439/620.22 |
| 5,987,370 A * | 11/1999 | Murphy et al. | ........... | 701/45 |
| 6,101,436 A * | 8/2000 | Fortune et al. | ........... | 701/45 |
| 6,246,936 B1 * | 6/2001 | Murphy et al. | ........... | 701/45 |
| 6,490,936 B1 * | 12/2002 | Fortune et al. | ........... | 73/862.581 |
| 6,927,678 B2 | 8/2005 | Fultz et al. | | |
| 6,999,301 B1 | 2/2006 | Sanftleben et al. | | |
| 2006/0196702 A1 | 9/2006 | Hansen et al. | | |

* cited by examiner

*Primary Examiner*—Max Noori
(74) *Attorney, Agent, or Firm*—Douglas D. Fekete

(57) ABSTRACT

A capacitive sensor apparatus is disposed between the bottom cushion and frame of a seat. The sensor apparatus includes first and second mutually parallel rigid force translation plates biased apart by a set of springs, first and second conductor plates centrally affixed to inboard faces of the first and second force translation plates, and a control circuit responsive to the gap capacitance between the first and second conductor plates. The force translation plates are joined in a manner to maintain the conductor plates parallel to each other while permitting movement of either force translation plate relative to the other in a mutually perpendicular direction.

8 Claims, 10 Drawing Sheets

CAPACITIVE SENSOR APPARATUS FOR PASSENGER PRESENCE DETECTION

This application claims the benefit of U.S. Provisional Patent Application Ser. No. 60/844,621, filed Sep. 14, 2006, which is incorporated by reference.

TECHNICAL FIELD

The present invention is directed to a capacitive sensor disposed in a vehicle seat for detecting the presence of a passenger on the seat.

BACKGROUND OF THE INVENTION

Occupant presence detection is frequently used in connection with air bags and other pyrotechnically deployed restraints as a means of determining if the restraints should be deployed in the event of sufficiently severe crash. One commonly employed way of detecting occupant presence involves installing a fluid-filled bladder in or under the bottom foam cushion of the vehicle seat and measuring the fluid pressure in the bladder with a pressure sensor. Exemplary systems of this type are disclosed, for example, in the U.S. Pat. Nos. 5,987,370 and 6,246,936 to Murphy et al., and the U.S. Pat. Nos. 6,101,436 and 6,490,936 to Fortune et al., all of which are assigned to Delphi Technologies, Inc., and incorporated herein by reference.

In a somewhat different approach, the cost of the pressure sensor can be avoided by providing conductor plates on or near the upper and lower surfaces of a fluid-filled bladder, and detecting changes in capacitance between the plates when the thickness of the bladder changes due to the presence of occupant weight. See, for example, the U.S. Pat. No. 6,927,678 to Fultz et al., assigned to Delphi Technologies, Inc. and incorporated herein by reference.

In yet another approach, the upper and lower plates of a capacitive sensor are separated by a layer of foam or other compressible material instead of a fluid-filled bladder. See, for example, the U.S. Pat. No. 6,999,301 to Sanftleban et al. and the U.S. Patent Application Publication No. 2006/0196702 to Hansen et al., both of which are assigned to Delphi Technologies, Inc., and incorporated herein by reference.

SUMMARY OF THE INVENTION

The present invention is directed to an improved capacitive sensor apparatus disposed between the bottom cushion and frame of a seat. The sensor apparatus includes first and second mutually parallel rigid force translation plates biased apart by a set of springs, first and second conductor plates centrally affixed to inboard faces of the first and second force translation plates, and a control circuit responsive to the gap capacitance between the first and second conductor plates. The force translation plates are joined in a manner to maintain the conductor plates parallel to each other while permitting movement of either force translation plate relative to the other in a direction perpendicular to the force translation plates.

DESCRIPTION OF THE PREFERRED EMBODIMENT

The capacitive sensor apparatus of the present invention is disclosed herein in the context of an apparatus for sensing the weight applied to a vehicle seat by a passenger. The sensed weight is used for passenger presence detection, and for classifying a detected passenger as a child, an adult, or some other classification. In general, a capacitive sensor comprises upper and lower conductor plates 28 and 30 separated by a dielectric substance (primarily air in the illustrated embodiment), and packaged such that weight applied to the seating surface of the seat reduces the separation distance of the conductor plates, thereby increasing the electrical capacitance between the upper and lower plates. As applied to a vehicle seat, the capacitive sensor apparatus is preferably disposed between the frame and bottom cushion of the seat as depicted herein, possibly with a felt pad disposed between the sensor apparatus and the seat frame, but it should be understood that the sensor apparatus may be installed in a different location such as in the bottom cushion, in or behind a back cushion, and so on. Also, it should be understood that the disclosed sensor apparatus may be used in other applications, both vehicular and non-vehicular.

Figure 1:
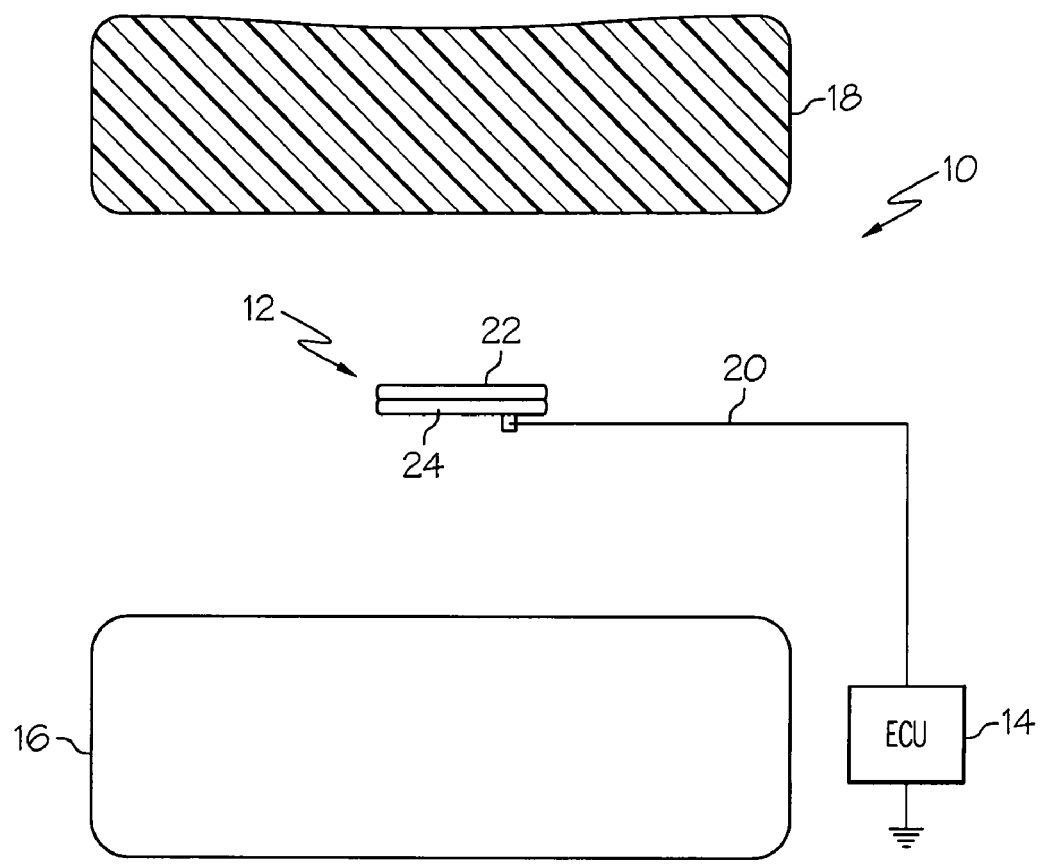
FIG. 1 diagrammatically depicts a vehicle seat equipped with a capacitive sensor apparatus according to this invention.
Figure 2:
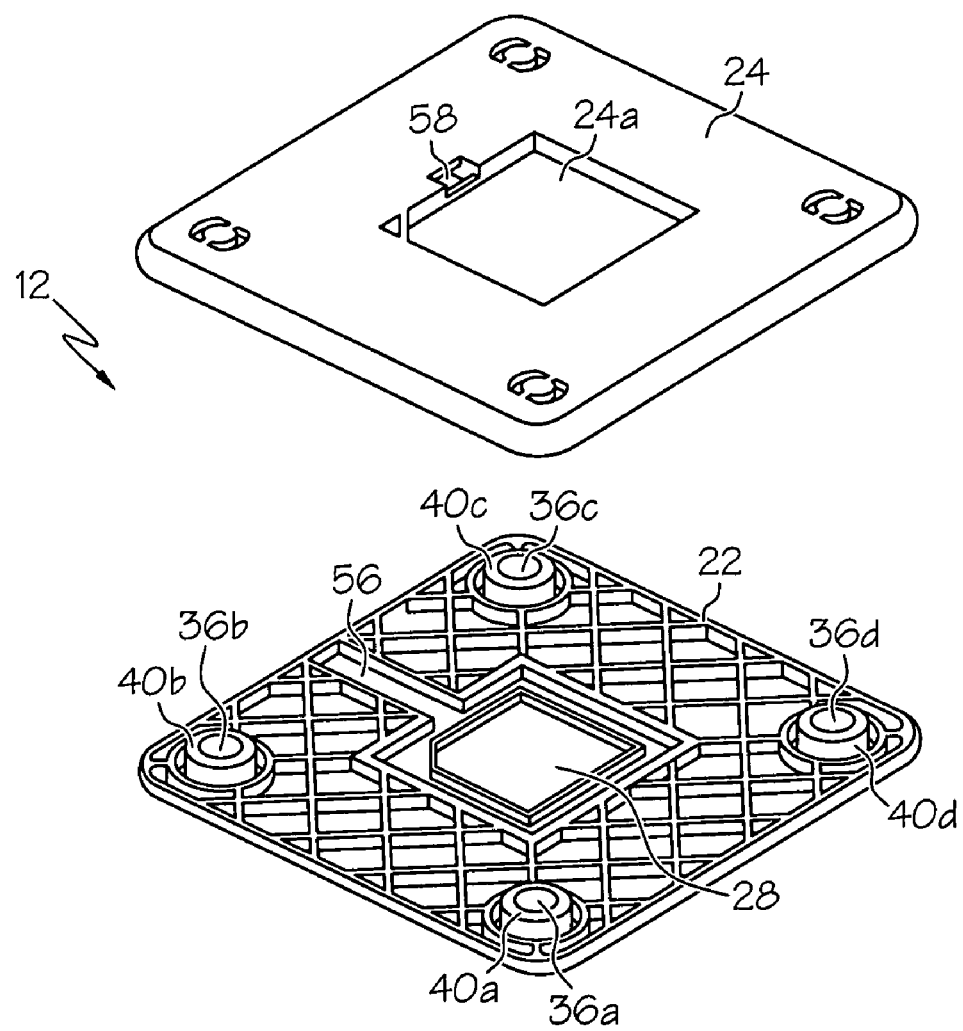
FIG. 2 depicts first and second force translation plates of the sensor apparatus of FIG. 1 according to a first embodiment, including an inboard face of the first force translation plate and a first conductor plate.
Figure 3:
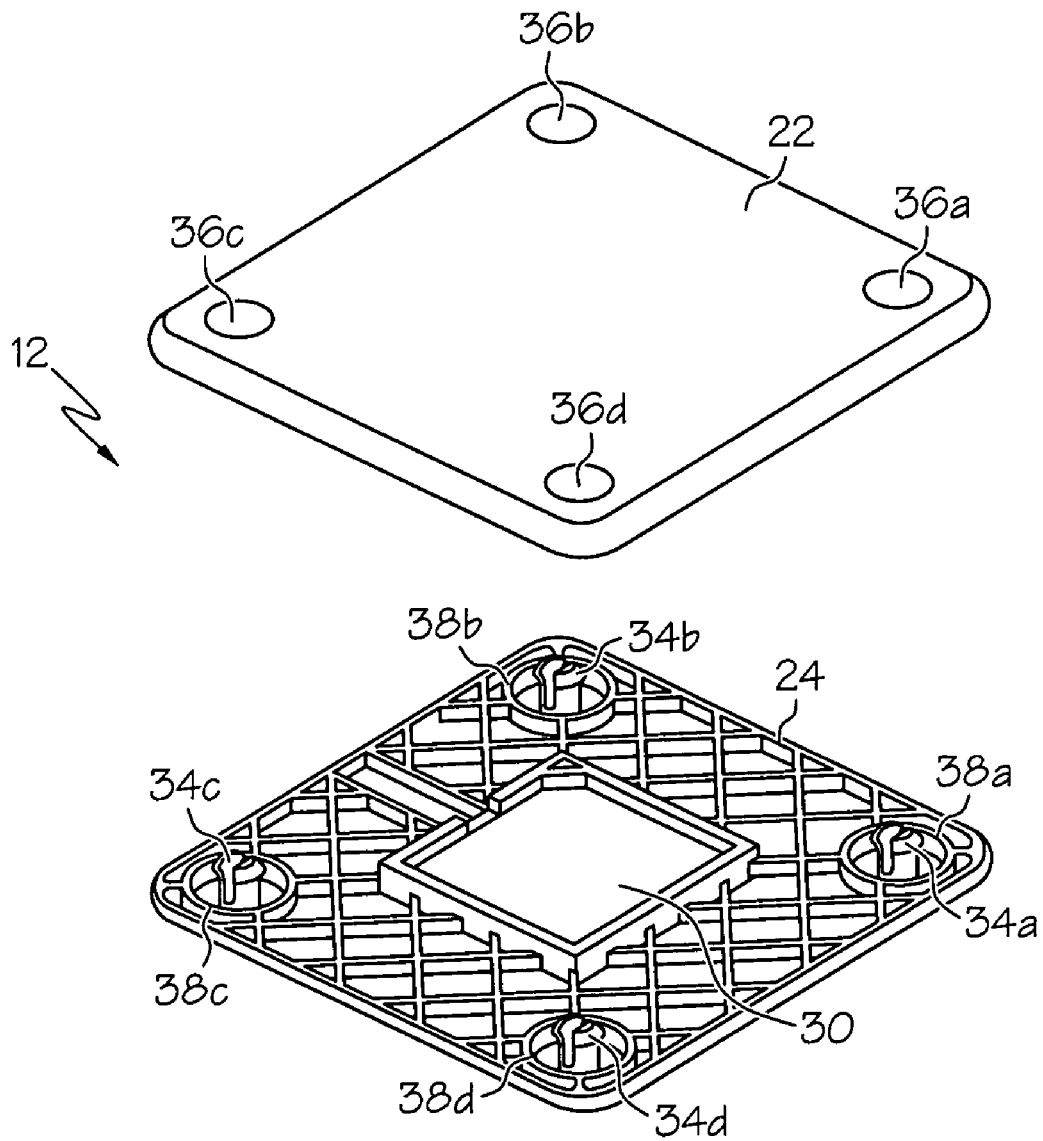
FIG. 3 depicts the first and second force translation plates of the sensor apparatus of FIG. 1 according to the first embodiment, including an inboard face of the second force translation plate and a second conductor plate.
Figure 4:
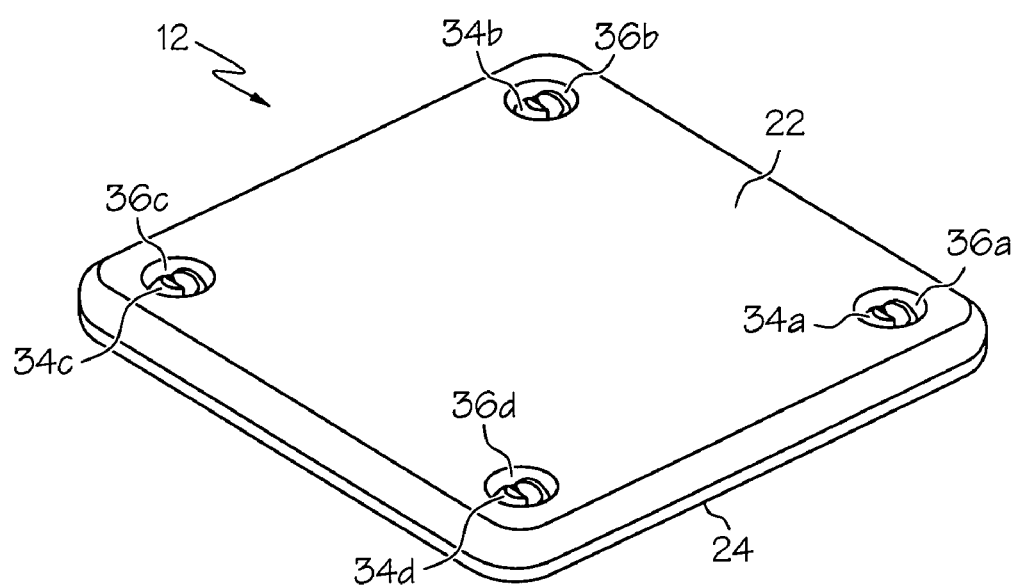
FIG. 4 depicts first and second force translation plates of the sensor apparatus of FIG. 1 according to first embodiment, as assembled.
Figure 5:
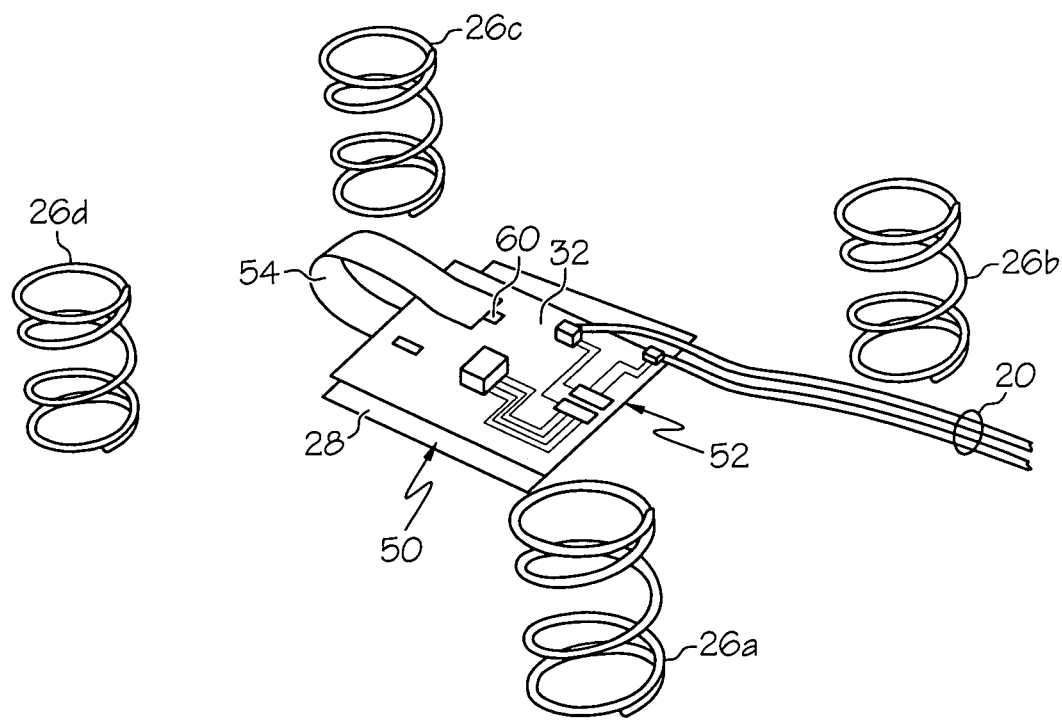
FIG. 5 depicts a control circuit and a set of springs for the sensor apparatus of FIG. 1.

Referring to FIG. 1, the reference numeral 10 generally designates a seat bottom and a sensor apparatus according to this invention. The sensor apparatus 12 is disposed between the seat frame 16 and a foam seat cushion 18, and is coupled to an electronic control unit (ECU) 14 by an electrical cable 20. In a typical installation, the ECU 14 is an airbag control unit.

Referring to FIGS. 2-9, the sensor apparatus 12 includes first and second rigid force translation plates 22, 24; a set of springs 26a, 26b, 26c, 26d; a first conductor plate 28 affixed to an inboard face of first force translation plate 22; a second conductor plate 30 affixed to an inboard face of second force translation plate 24; and a control circuit 32. In the illustrated embodiment, the force translation plates are formed of molded plastic, and ribs formed on their inboard faces add rigidity to resist bending due to externally applied forces. Alternately, the force translation plates 22 and 24 may be constructed of a non-insulative rigid material such as die-cast metal or stamped sheet metal, provided the conductor plates 28 and 30 are insulated from the respective force translation plates 22 and 24. As indicated in FIG. 1, the sensor apparatus 12 is mounted in seat 10 such that the first force translation plate 22 is facing upward (that is, toward the seat cushion 18), and the second force translation plate 24 is facing downward (that is, toward the seat frame 16). In this orientation, the conductor plate 28 is regarded as the upper conductor plate, and the conductor plate 30 is regarded as the lower conductor plate.

The force translation plates 22 and 24 are joined in a manner to maintain the conductor plates 28 and 30 parallel to each other while permitting movement of either force translation plate 22, 24 relative to the other in a direction perpendicular to the force translation plates 22, 24. In the illustrated embodiment, the conductor plates 28 and 30 are similar in size, and are affixed to the force translation plates 22 and 24 such that they substantially overlap each other. The conductor plates 28, 30 occupy a small portion of the force translation plates 22, 24; in the illustrated embodiment, the conductor plates 28, 30 have a surface area of approximately 1.69 in$^2$, while the force translation plates have a surface area of approximately 16 in$^2$.

Figure 7:
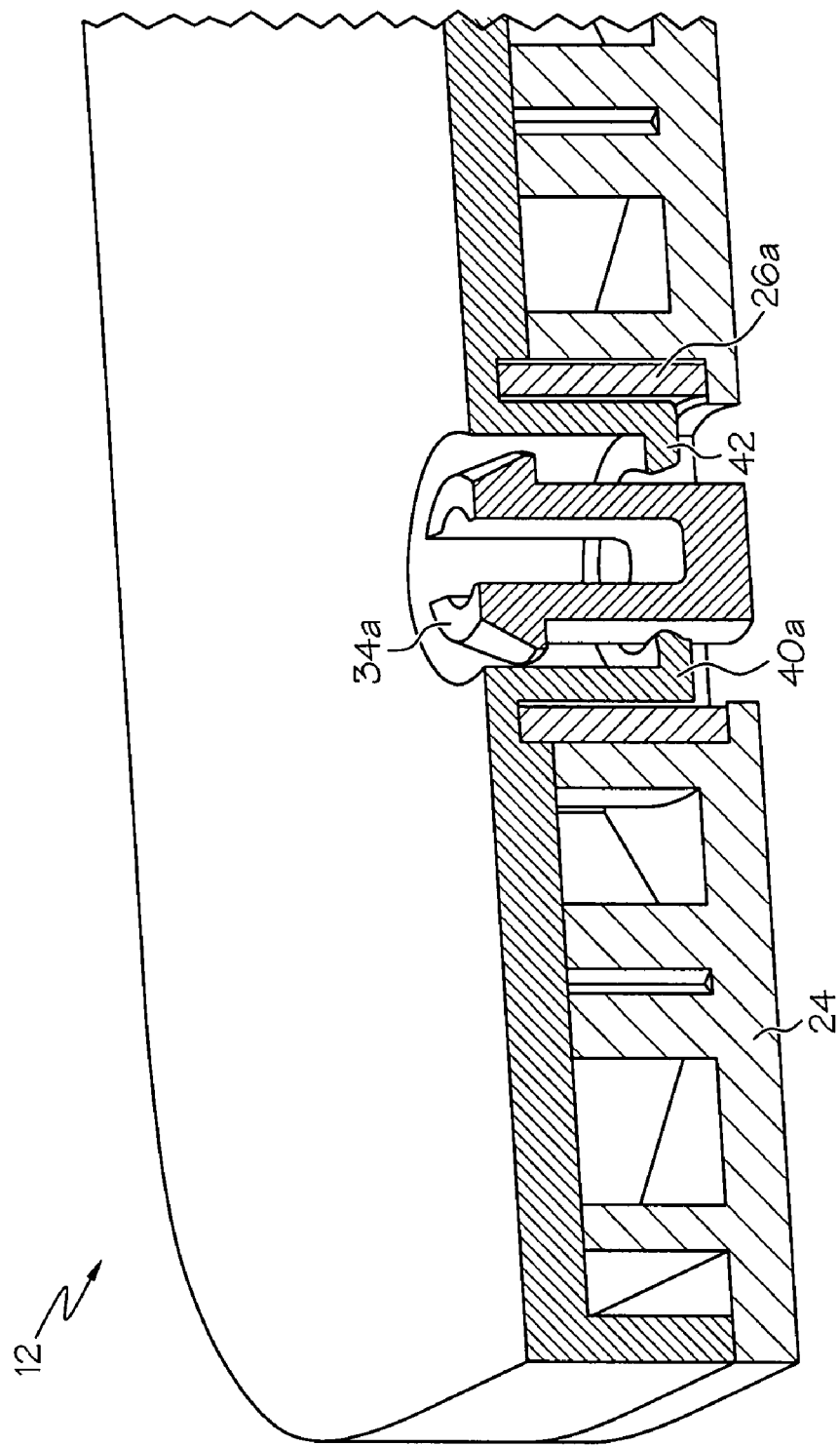
FIG. 7 is a partial cross-sectional view of assembled first and second force translation plates of the sensor apparatus of FIG. 1, according to a second embodiment.

The inboard face of force translation plate 24 has a set of four inwardly extending snap posts 34a, 34b, 34c, 34d, and the force translation plate 22 has a set of corresponding openings 36a, 36b, 36c, 36d for receiving the snap posts 34a, 34b, 34c, 34d. The snap posts 34a, 34b, 34c, 34d of force translation plate 24 are each surrounded by a circular wall 38a, 38b, 38c, 38d. A boss 40a, 40b, 40c, 40d surrounding each opening 36a, 36b, 36c, 36d of force translation plate 22 nests in the space between a respective snap post 34a-34d and circular wall 38a-38d. The springs 26a-26d are disposed about the bosses 40a-40d between the force translation plates 22 and 24 to bias the plates 22 and 24 apart in a direction perpendicular to the plates 22, 24. As shown in FIG. 7, interference between a given snap post 34a and an annular wall 42 of a respective boss 40a defines a maximum separation distance of the force translation plates 22 and 24. The parameters of springs 26a-26d are selected to achieve a desired force vs. deflection characteristic by setting both the spring pre-load (i.e., the spring bias force at the maximum separation distance of force translation plates 22 and 24) and the spring rate (i.e., the force vs. deflection relationship for passenger force in excess of the pre-load bias force.

Figure 6:
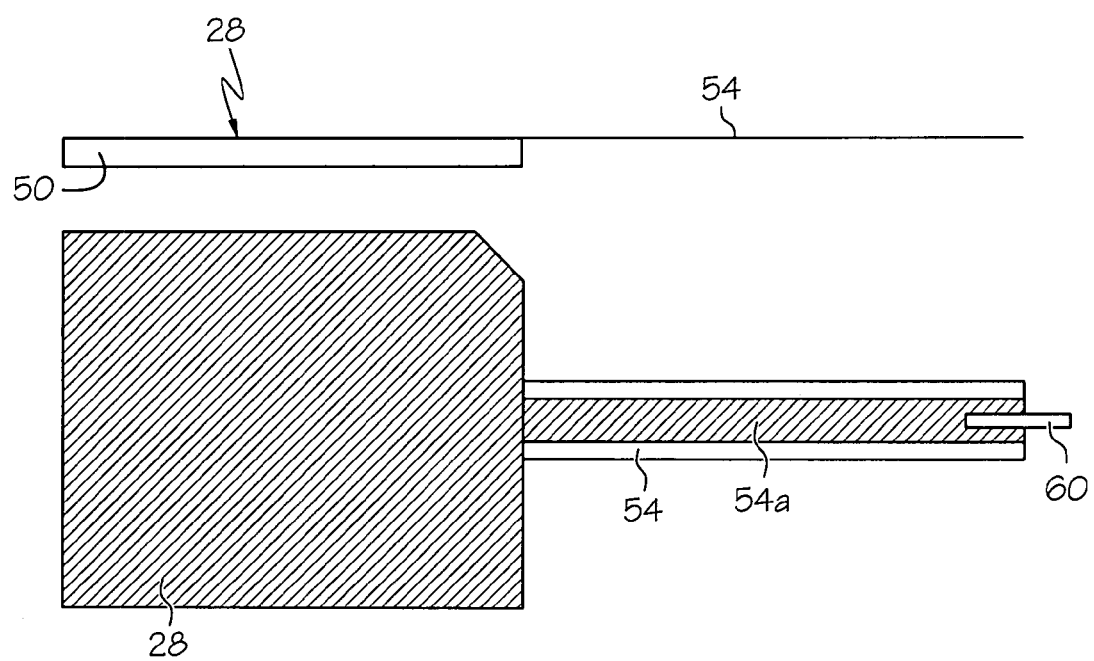
FIG. 6 depicts the second conductor plate and a contiguous flexible runner.
Figure 8:
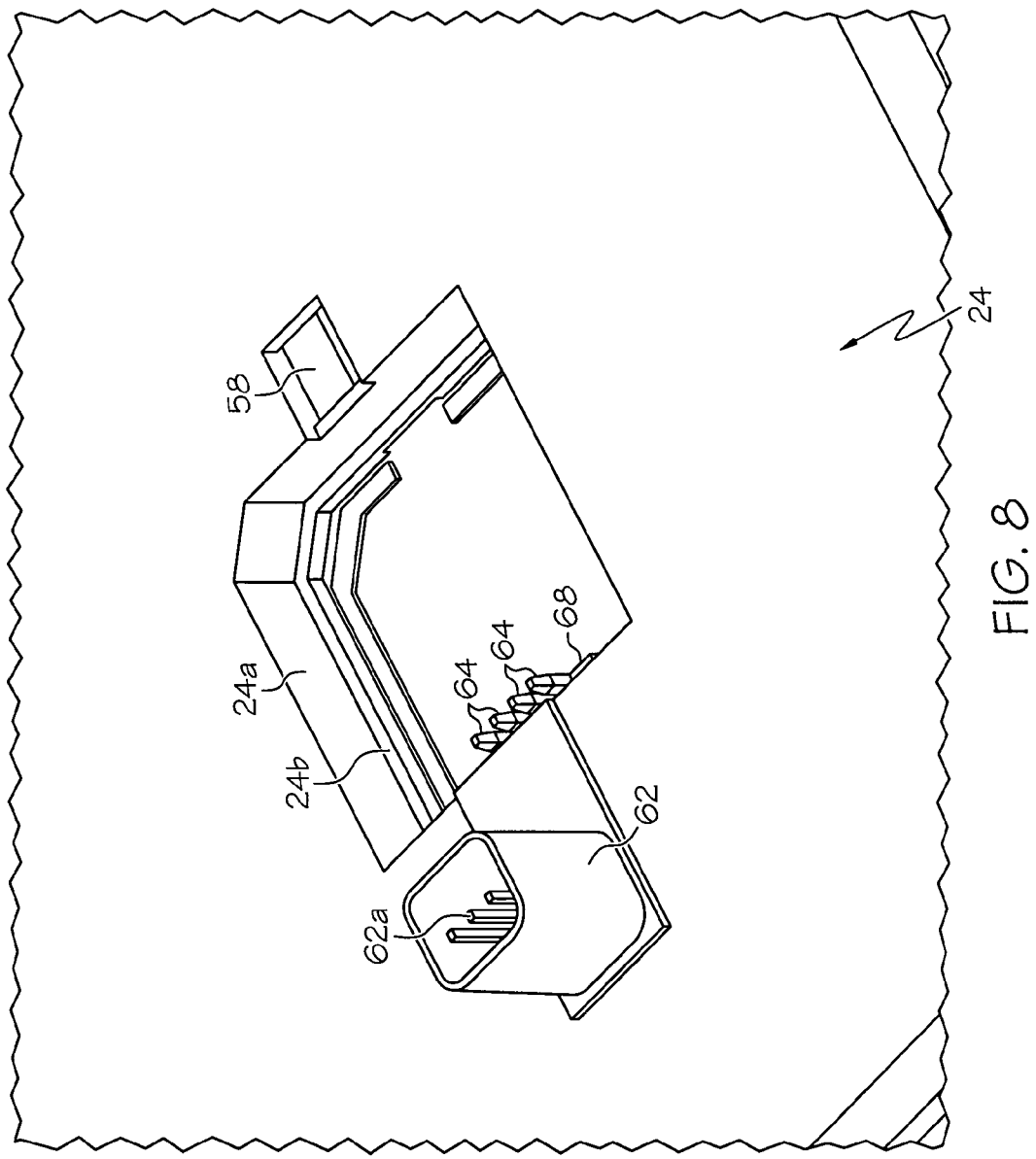
FIG. 8 is an isometric view of an outboard face of the second force translation plate, according to the second embodiment.
Figure 9:
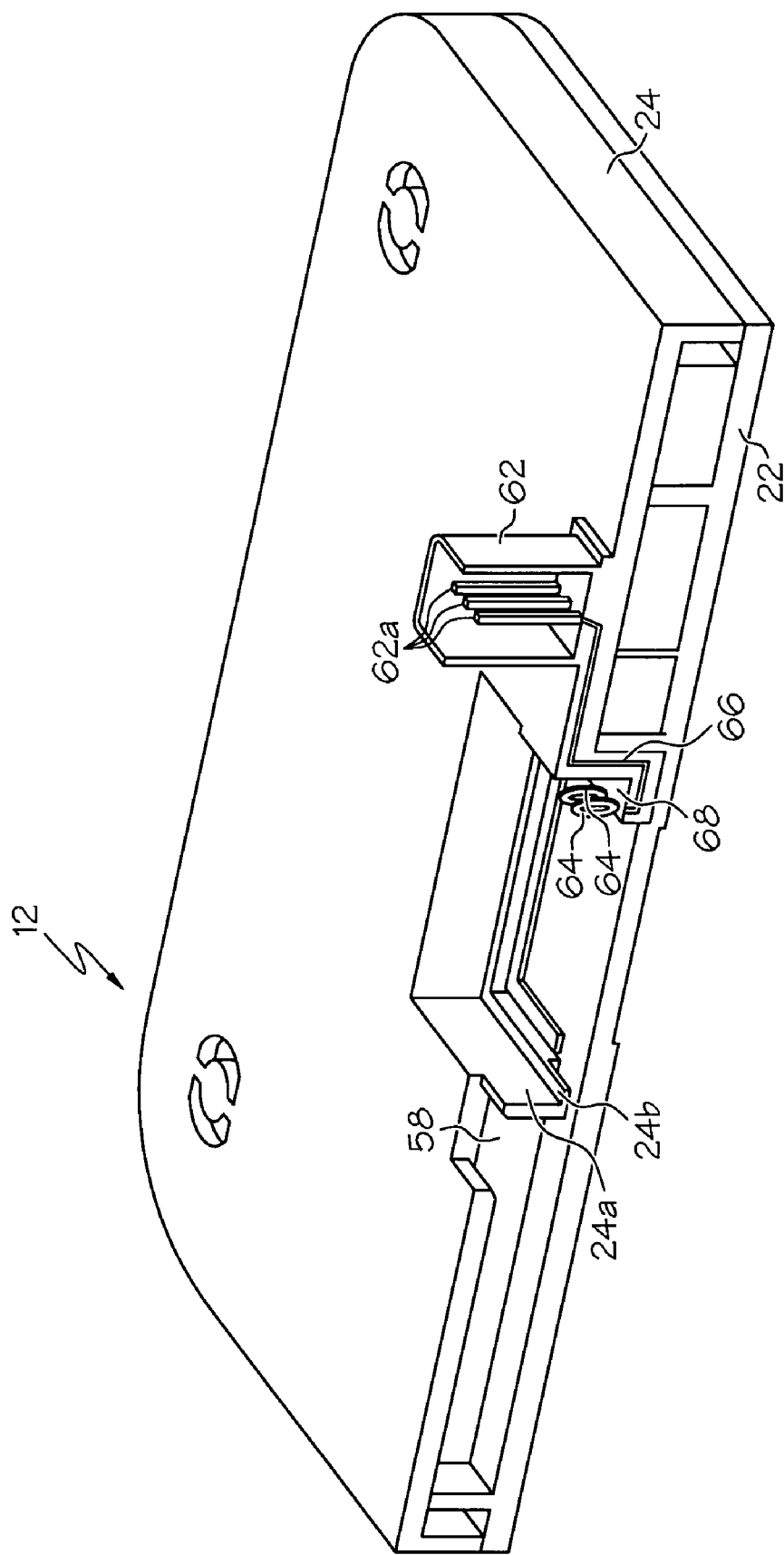
FIG. 9 is a partial cross-sectional view of assembled first and second force translation plates of the sensor apparatus of FIG. 1, according to the second embodiment.

The conductor plate 28 occupies one face of a single-sided printed circuit board 50 that is affixed to the inboard face of force translation plate 22 by an adhesive, for example. The conductor plate 30 occupies one face of a double-sided circuit board 52, and the control circuit 32 is disposed on the opposite face of circuit board 52. As best seen in FIGS. 8-9, the force translation plate 24 is provided with a central opening 24a and an inwardly extending shoulder or ledge 24b within the opening 24a. The margin of circuit board 52 is supported on the ledge 24b, with the conductor plate 30 facing the conductor plate 28. This leaves the control circuit 32 exposed. As best seen in FIG. 6, the single-sided printed circuit board 50 is provided with a flexible circuit pig-tail or runner 54 carrying a conductor trace 54a that is electrically tied to the conductor plate 28. When the circuit board 50 is installed in the force translation plate 22, the flexible runner 54 is disposed in part in a channel 56 formed on the inboard face of plate 22, and extends through a slot aperture 58 formed in the force translation plate 24 adjacent the opening 24a. The conductor trace 54a terminates in a solderable tab 60, which is soldered to a terminal of control circuit 32 to electrically couple the conductor plate 28 to the control circuit 32.

Though the runner 54 is implemented as a flexible strip circuit in the illustrated embodiment, it should be understood that it could alternately be implemented with a different kind of flexible conductor such as a simple wire or a conductive spring.

The sensor apparatus 12 is assembled as follows. First, the circuit board 50 is affixed to the inboard face of force translation plate 22, and the flexible runner 54 is threaded through the slot aperture 58 of force translation plate 24. The springs 26a-26d are positioned about the bosses 40a-40d of force translation plate 22, and the force translation plates 22 and 24 are snapped together, with the snap posts 34a-34d of plate 24 passing into the openings 36a-36d of plate 22. The circuit board 52 is then placed on (or affixed to) the ledge 24b of force translation plate 24 with the control circuit 32 facing outward, and the tab 60 at the end of flexible runner 54 is soldered to a terminal of control circuit 32. Potting material (not shown) is then dispensed onto the exposed face of control circuit 32 within the sidewalls of opening 24a. When cured, the potting material seals the control circuit 32 and retains the circuit board 52 in place on ledge 24b.

Theoretically, the cable 20 between ECU 14 and control circuit 32 can be directly connected to control circuit terminals, with the potting material in opening 24a of force translation plate 24 fixing the cable 20 with respect to the control circuit 32. As a practical matter, however, the cable 20 will usually have a connector at each end to facilitate installation in a seat 10. Accordingly, the sensor apparatus 12 will usually be provided with a connector as well. This may be accomplished most easily by mounting a connector (including electrical terminals supported in a plastic housing) such as designated by the reference numeral 62 in FIGS. 8-9 directly on the exposed face of circuit board 52 such that it is surrounded by the potting material dispensed into opening 24a of force translation plate 24. The connector housing will protrude from the potting material so that it is accessible for attachment to the cable connector. If the potting material is sufficiently thick, it will serve when cured to fix the connector with respect to the rest of the sensor apparatus 12, and isolate the circuit board 52 from forces applied to the connector housing. Another approach, depicted in FIGS. 8-9, is to integrate the connector 62 into the outboard face of force translation plate 24, and to internally couple the connector terminals 62a to the control circuit 32. Referring to FIG. 9, this may be achieved with a set of compliant pins 64 and a set of insert molded conductors 66. The compliant pins 64 extend out of an extension 68 of ledge 24b such that they pass through plated through-holes formed in the margin of circuit board 52 when circuit board 52 is installed on the ledge 24a. The plated through-holes are electrically coupled to control circuit terminals, and the insert-molded conductors 66 electrically tie the compliant pins 64 to the connector terminals 62a.

Figure 10:
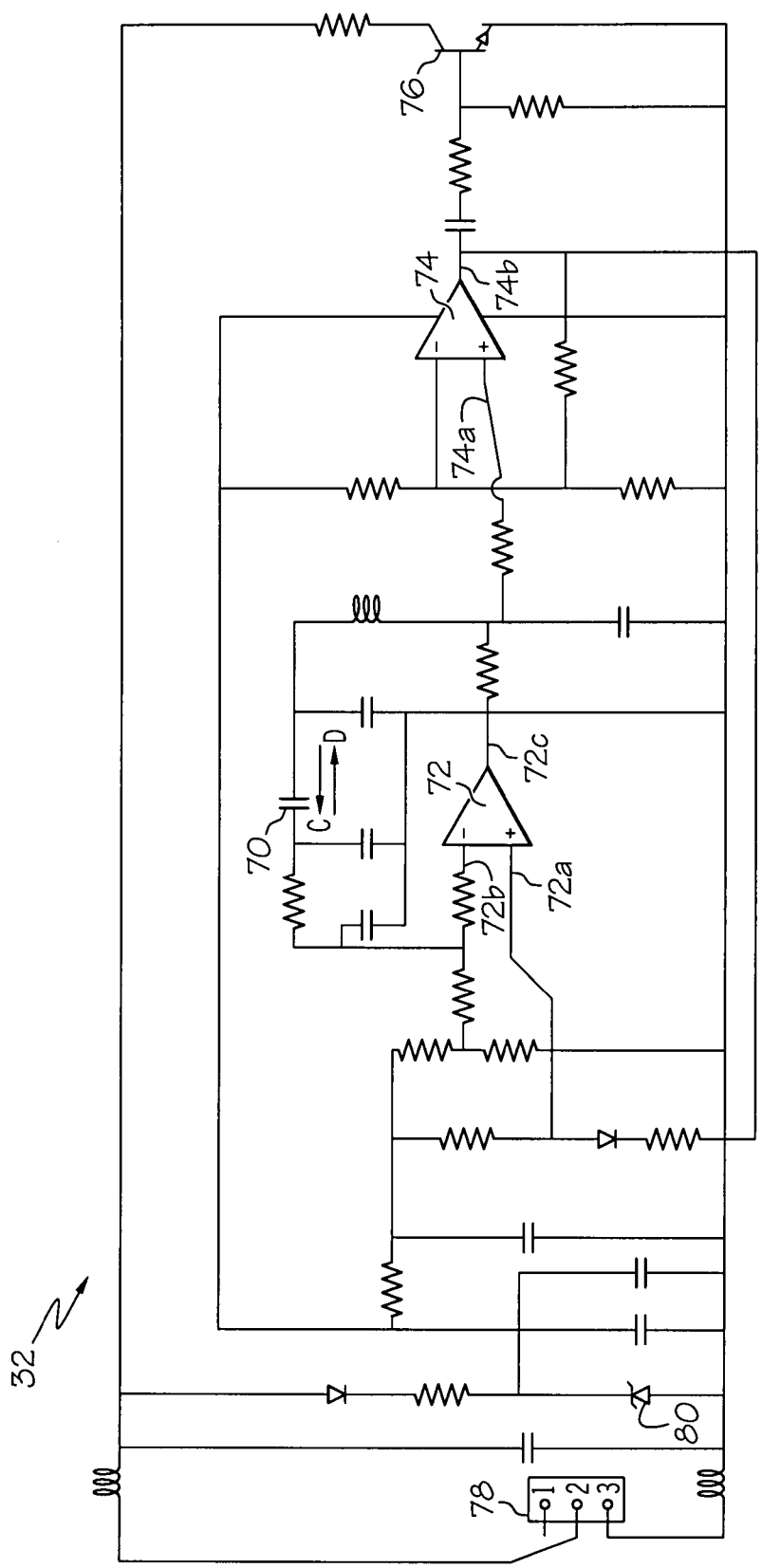
FIG. 10 is a schematic diagram of the control circuit of FIG. 5.

FIG. 10 is a schematic diagram of the control circuit 32. The control circuit 32 is designed to measure the gap capacitance between the conductor plates 28 and 30. This capacitance will vary depending on the separation distance of plates 28 and 30. When the seat 10 is unoccupied, the separation distance is approximately 0.210 inch, and the gap capacitance has a relatively low value such as 5 pF. When the seated weight of a passenger is sufficient to fully compress the sensor apparatus 12, the separation distance will be approximately 0.050 inch, and the gap capacitance will have a relatively high value such as 25 pF.

In the schematic diagram of FIG. 10, the gap capacitance is represented by the capacitor 70. The capacitance of capacitor 70 is evaluated by a constant current source formed by operational amplifier 72, configured as a voltage-to-current converter. A high control voltage applied to the non-inverting input 72a of amplifier 72 will exceed the voltage applied to the inverting input 72b of amplifier 72; in this case the output 72c of amplifier 72 is driven to a high state, and a charging current flows through capacitor 70 as indicated by arrow C. Conversely, a low control voltage at the non-inverting input 72a drives the output 72c of amplifier 72 to a low state, and a discharging current flows through capacitor 70 as indicated by arrow D.

The output 72c of amplifier 72 is applied to the non-inverting input 74a of comparator 74 so that its output 74b transitions from high to low with the charging and discharging of capacitor 70. The comparator 74 also has hysteresis to allow output voltage operation of amplifier 72 from 2 to 4 volts. The square-wave output voltage of comparator 74 regulates the control voltage applied to the non-inverting input 72a of amplifier 72. The output 74b of comparator 74 is also capacitively coupled to the base of transistor 76 to provide a corresponding output at pin 2 of the harness connector 78, which also serves as a power supply for the circuit via zener diode 80. In other words, the transistor 76 modulates the power supply bus at the charge/discharge frequency of capacitor 70.

The output 72c of amplifier 72 is a triangular waveform due to the charging and discharging of capacitor 70. Since the charge and discharge rates vary with the capacitance of capacitor 70, the frequency of the waveform provides a measure of the capacitance—that is, the gap capacitance between conductor plates 28 and 30. The power supply bus is modulated at the same frequency, and ECU 14 determines the frequency by measuring the supply bus modulation over a full cycle. This has the benefit of compensating for slowly changing external static fields since the effect of such a field is balanced out over a full cycle of the triangular waveform. Rapidly changing external static fields such as EMI or localized RF currents are handled by the faraday shielding effect of having the right side of capacitor 70 (that is, conductor plate 28) as the separate plate and the left (high impedance) side of capacitor 70 (that is, conductor plate 30) as the second layer of the control circuit 32.

In summary, the present invention provides a practical and cost-effective sensor apparatus for passenger presence detection. While the apparatus has been described in reference to the illustrated embodiment, it should be understood that various modifications in addition to those mentioned above will occur to persons skilled in the art. For example, the conductor plates 28 and 30 may be patterned instead of solid, and so forth. Also, the space between conductor plates 28 and 30 can be at least partially filled with a crushable or displaceable medium such as silicone gel in order to minimize changes in the sensor capacitance due to humidity variations in the vicinity of the sensor apparatus 12; alternately, the control circuit 32 could include a humidity sensor in order to electrically compensate for any variability due to humidity. Moreover, it should be recognized that the term capacitance as used herein is simply a way of characterizing the change in electric field coupling between the first and second conductor plates 28 and 30, and any technique for measuring the change in such coupling is essentially equivalent for purposes of this invention. Accordingly, it is intended that the invention not be limited to the disclosed embodiment, but that it have the full scope permitted by the language of the following claims.

The invention claimed is:

1. Sensor apparatus for detecting the presence of a passenger on a seat, comprising:
   first and second rigid planar force translation plates disposed in said seat;
   joining means for joining said force translation plates in a manner that maintains them substantially parallel to each other while permitting movement of either force translation plate relative to the other in a direction perpendicular to said force translation plates;
   a set of springs disposed between said first and second force translation plates for exerting a bias force that biases said first and second force translation plates apart in said perpendicular direction;
   first and second conductor plates centrally affixed to inboard faces of said first and second force translation plates, respectively; and
   a control circuit responsive to a gap capacitance between said first and second conductor plates for detecting the presence of said passenger when a weight of said passenger overcomes the bias force of said springs.

2. The sensor apparatus of claim 1, where:
   said first conductor plate is formed on first circuit board affixed to the inboard face of said first force translation plate; and
   said second conductor plate and said control circuit are mounted on opposite sides of a second circuit board affixed to the inboard face of said second force translation plate.

3. The sensor apparatus of claim 2, where said control circuit is electrically coupled to said second conductor plate through said second circuit board, and the apparatus additionally comprises a conductive element electrically coupling said first conductor plate to said control circuit.

4. The sensor apparatus of claim 3, further where:
   said control circuit is mounted on an outboard face of said second circuit board;
   said conductive element is a flexible conductor; and
   said flexible conductor passes through a slot aperture in said second force translation plate adjacent said second circuit board to reach said control circuit.

5. The sensor apparatus of claim 1, where:
   said second force translation plate has a central opening with an interior ledge recessed in said opening; and
   said control circuit is mounted on an outboard face of a circuit board disposed within said central opening and supported on said interior ledge.

6. The sensor apparatus of claim 5, where:
   said second force translation plate has a slot aperture adjacent said central opening; and
   said first conductor plate is electrically coupled to said control circuit by a flexible conductor that passes through said slot aperture.

7. The sensor apparatus of claim 5, where:
   said second force translation plate includes an electrical connector for coupling said control circuit to a remote electronic module, and insert molded conductors coupled between said control circuit and said electrical connector.

8. The sensor apparatus of claim 7, where said insert molded conductors include a set of compliant pins that protrude from said interior ledge and pass through a margin of said circuit board.

* * * * *